June 5, 1951 R. B. PONTIUS 2,555,996
VALVE
Filed May 28, 1945
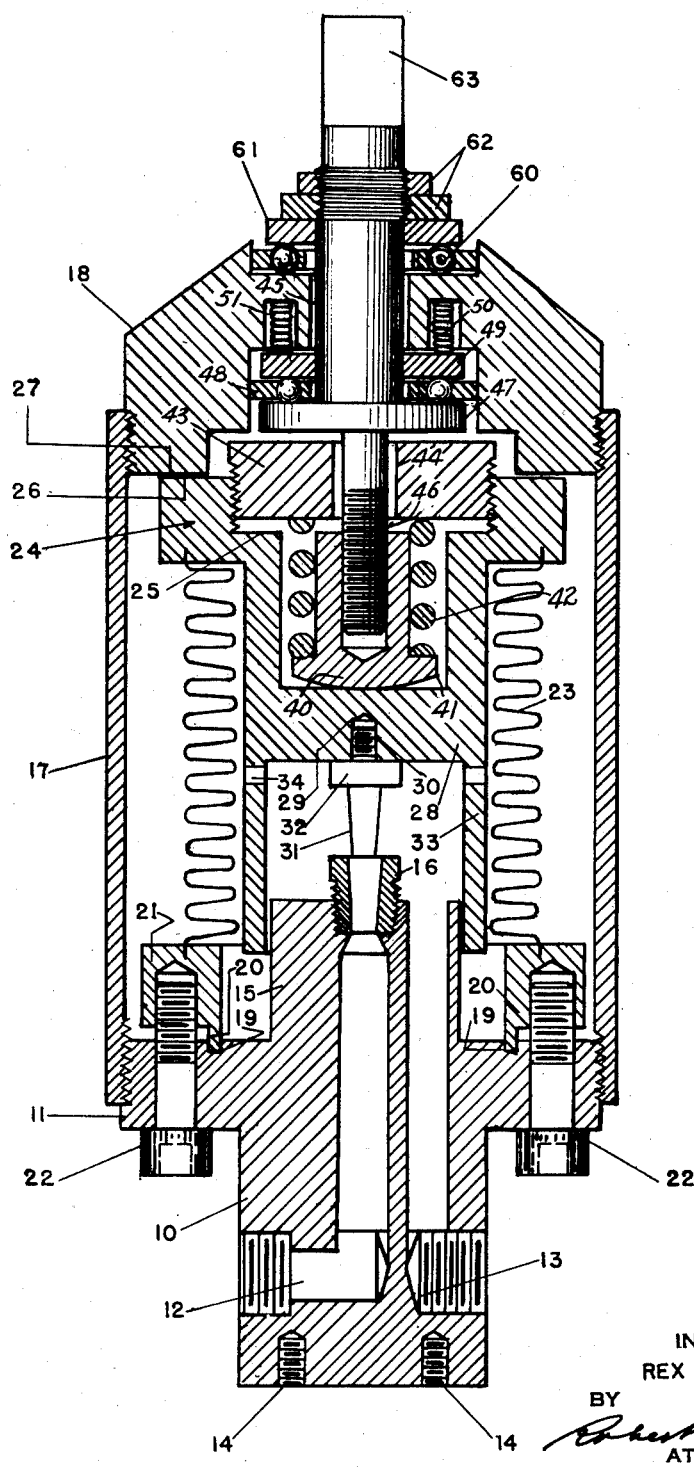
INVENTOR
REX B. PONTIUS
BY
ATTORNEY Patented June 5, 1951

2,555,996

UNITED STATES PATENT OFFICE 2,555,996

VALVE

Rex B. Pontius, New York, N. Y., assignor to the United States of America as represented by the United States Atomic Energy Commission Application May 28, 1945, Serial No. 596,216

3 Claims. (Cl. 251—31)

This invention relates to a valve and particularly to a valve for controlling the flow of corrosive gases.

The valving of corrosive gases presents a very difficult engineering problem, because the gases tend to attack the available materials of which valves are made, particularly at joints and sealing points. After a time joints are weakened and seals become imperfect so that conditions near the valve are made unsafe by the escaping corrosive fumes, and the valve must be replaced. It has proved to be difficult to design a valve that would accurately control gas flow without exposing the valve controls, some of which are preferably made of corrodible materials for ease in fabrication, to attack by the gases. These problems become particularly important in connection with the handling of rare gases such as certain of the metallic fluorides. So far as is known, no known type of valve has been wholly satisfactory in such use.

It is an object of the invention to construct a valve having a minimum number of moving parts exposed to the fluids which pass through the valve. Another object of the invention is to seal the operative parts of the valve so that corrosive fluids may be passed therethrough with substantially no risk of escape. Another object is to design a valve having floating parts that are continuously kept in alignment. It is another object to construct a valve having a working chamber without packing. Another object is to construct a valve having improved elements for controlling the flow of fluids. Another object of the invention is to construct a valve having a control chamber of variable size with a flexible wall encompassing the flow controlling elements. Another object of the invention is to mount a bellows detachably in sealing relation to the mounting means. It is another object of the invention to provide a valve having precise fluid control through the whole range of flows required. Another object of the invention is to provide a valve of the needle type having replaceable needle and seat. Other objects of the invention are in part apparent and will be in part set forth as the description proceeds.

The drawing shows in vertical section an enlarged view of a preferred form of the invention. This drawing represents a valve having a maximum needle travel of three-eighths of an inch.

Referring now to the numerals in the drawing, 10 is a base member having an annular flange 11, and passages 12 and 13, either of which may serve as the inlet, the other serving as the outlet. These passages may be screw-threaded at their lower ends to provide mountings for suitable pipe fittings or the like. The bottom of the base member 10 is provided with screw-threaded borings 14 for the reception of mounting bolts. The base member is continued upwardly in the form of a boss beyond the flange 11 as indicated at 15 and the outer surface of the boss 15 is machined to serve as a guide for the moving parts of the valve and for centering the valve needle accurately with respect to the valve seat. The upper portion of the passage 12, as illustrated in the drawing, is provided with screw threads and an internal shoulder for the reception and positioning of externally threaded valve seat 16. In the form of the invention shown in the drawing the valve seat and the cooperating needle are each provided with a four degree flare in order to get good funnel action over the whole range of flows required, that is, the conical surface of the needle is parallel to the conical surface of the seat. The outer face of the flange 11 is provided with screw threads for the reception of a cylindrical casing 17 which carries bonnet 18 screw threaded into its upper end. The flange 11 is provided on its upper surface with an annular groove 19 which engages an annular flange 20 of the ring 21 and which contains a gasket such as a tin wire or the like. The ring 21 is held firmly in sealed relation against the gasket by the bolts 22. There is thus provided a novel means for sealing the lower end of the valve chamber against the escape of gases. The flange 20 can be held against the wire in the groove 19 by whatever force is needed to effect sealing.

The valve comprises novel means for supporting and operating a valve needle in relation to the valve seat, and with novel means for enclosing the operating parts of the valve in an extensible chamber. Included in the said novel means are a metallic bellows 23 of the Sylphon type which is appropriately mounted and sealed at the bottom in a groove in the surface of the ring 21 and at the top in an appropriate groove in the top valve member 24 which carries the valve needle 31. The bellows and the base and top members of the valve may be sealed against the escape of gases by the use of solder, by welding, or the like. There are a number of methods of connecting such extensible bellows to seal them and any satisfactory gas-tight method may be employed. The top member 24 is cup-shaped and has an internal shoulder 25. The upper surface 26 of the top member engages the lower surface 27 of the bonnet 18 and prevents the withdrawal of the valve needle beyond the position at which the valve is fully open. The bottom 28 of the cup-shaped member 24 is provided with a screw-threaded hole 29 for the reception of the screw-threaded stud 30 of the valve needle 31. The needle 31 has a collar 32 which positions the needle accurately relative to the valve seat 16 when the parts are assembled.

It will be understood, from consideration of the structure that has just been described, that there is provided within the valve body a valve chamber bounded by a top member 24, a base member 10, and an extensible wall 23. The chamber encloses both operating parts of the valve and the inlet and outlet ports. The valve needle is accurately positioned over the valve seat by the cylindrical guide skirt or sleeve 33 that extends downwardly from the top member 24 in cooperating relation to the guide surface formed on the boss 15 of the base. A clearance of about .003 inch may be left between the guide surfaces in ordinary circumstances. It is desirable in most instances to provide the guide sleeve 33 with openings 34 so that gases will not be entrapped and compressed between the outer surface of the top member 24 and the bellows 23. The upward travel of the top member 24 is arrested by the engagement of the abutting surfaces 26 and 27, and its downward motion is arrested by the engagement of the valve needle 31 with the cooperating surface of the valve seat 16 to seal the chamber against the passage of fluid.

It is important that valves of this type be capable of accurate adjustment so that the flow of fluid may be precisely controlled. Therefore, novel means for adjusting the needle with respect to the valve seat are provided. For this purpose a coupling 40 is provided having a curved bearing surface 41 that bears upon the bottom of the cup-shaped member 24. The lower part of the coupling is provided with an annular flange upon which a spring 42 is made to bear. The spring 42 is held between the said annular flange and a bushing 43 threaded into the upper part of the cup-shaped member 24. The valve spindle 45 passes through the central opening 44 in the bushing 43 and the end of the spindle is threaded into the coupling 40 at 46. The spring 42 serves to prevent rotation of the coupling 40.

The spindle 45 is rotatable in a bearing mount contained in the bonnet 18. An annular flange 47 on the spindle 45 supports a ball bearing 48. The ball bearing 48 is urged against the flange 47 by springs 50 mounted in holes 51 in the bonnet 18. A washer 49 is interposed between the springs 50 and the bearing 48. The springs 50 permit a limited amount of tipping of the spindle. The top of the bonnet 18 has an annular recess surrounding the spindle and containing a ball bearing 60 which is pressed against the bonnet by the lock nuts 62 threaded on the spindle 45. A washer 61 is interposed between the lock nuts 62 and the bearing 60. The outer end of the spindle 45 has a polygonal cross section at 63 for the reception of a handle or the like.

As shown in the drawing the valve parts are in their fully opened positions, or nearly so. In order to adjust the flow of fluid the spindle 45 is rotated, turning its screw threads in the coupling 40. Thereby the coupling 40 and thus the cup-shaped member 24 are advanced toward the valve seat 16 while the coupling is prevented from rotating by means of the spring 42. There is thus provided a gradual and precise adjustment of the flow of fluid through the valve. The nut 43 can be adjusted to apply such pressure to the spring 42 as is needed to prevent the coupling 40 from rotating.

If the gases enter the chamber through passage 12 they pass the valve elements, enter the chamber formed by the base and top members and the bellows, are retained therewithin by the system of seals which has been described, and can escape only through the passage 13. It is thus seen that the controlling elements of the valve are all located within an extensible chamber the motion of whose parts gives precise and accurate adjustment to the needle and to the flow of fluid through the chamber.

A Sylphon bellows 1⅞ inches by 1⅞ inches will provide ⅜ inch of valve needle travel. The bellows can be sealed by hard or soft solder. The ring 21 can be sealed with a gasket, with tin solder, or other means if it is considered to be necessary, although the structure is such that adequate sealing in many instances can be obtained without the use of such additional means. The movable member of the valve is seen to have a floating relationship to the parts of the mechanism but its position with respect to the valve seat is accurately determined by means of the cooperating guides. There are many ways in which the parts could be guided, the one shown being preferred. Even though the valve needle were to become inclined at a small angle to the valve seat the part would still function properly because of the arrangement of parts described. Backlash, which is a fault found in many prior art valves, is restrained in this invention by the bonnet, and the small springs bearing upon the lower of the two ball bearings.

The spring 42 is preferably strong in order to counteract the effect of pressure differentials on the bellows. As the pressure inside the bellows drops there is an increasing tendency for the bellows to collapse and close the valve by compressing the spring. The spring should be made strong enough to withstand such tendencies.

Since many embodiments might be made of the present invention and since many changes might be made in the embodiment described, it is to be understood that the foregoing description is to be interpreted as illustrativ only and not in a limiting sense.

I claim:

1. A valve which comprises a valve body including a bonnet, a casing fixed to said bonnet and a base threaded into said casing, said base having a boss within said casing, an inlet conduit and an outlet conduit in said base, a valve seat located in one of said conduits, a valve member adapted to cooperate with said valve seat to regulate fluid flow through said conduits, a flexible bellows supporting said valve member and sealed between said valve member and said base to form a closed chamber which encloses said valve seat and with which said conduits communicate, a sleeve dependent from said valve member and fitting said boss for guiding the valve member and means for moving said valve member with respect to said valve seat.

2. A valve comprising a valve body having a bonnet and an inlet and an outlet conduit, a valve seat located in one of said conduits, a valve member adapted to cooperate with said valve seat to regulate fluid flow through said conduits, a flexible bellows supporting said valve member and sealed between said member and said valve body to form a closed chamber with which said conduits communicate, a threaded coupling member bearing against said valve member, a spindle rotatably mounted in said bonnet and threaded into said coupling member and spring means urging said coupling member against said valve member to prevent rotation of said coupling member.

3. A valve comprising a valve body including a bonnet, a casing secured to said bonnet and a base secured to said casing and having a boss within said casing, an inlet and an outlet conduit in said base through said boss, a valve seat located in one of said conduits, a valve member adapted to cooperate with said valve seat for controlling fluid flow through said conduits and having a guiding sleeve fitting said boss, a flexible bellows supporting said valve member and sealed between said valve member and said valve base to form a closed chamber with which said conduits communicate, a threaded coupling member bearing against said valve member, a spring rotatably mounted in said bonnet and threaded into said coupling member and spring means urging said coupling member against said valve member to prevent rotation of said coupling member.

REX B. PONTIUS.

REFERENCES CITED

The following references are of record in the file of this patent:

UNITED STATES PATENTS

| Number | Name | Date |
|---|---|---|
| 2,194,276 | Carlson | Mar. 19, 1940 |
| 2,308,183 | Lewis | Jan. 12, 1943 |
| 2,334,513 | Show | Nov. 16, 1943 |

FOREIGN PATENTS

| Number | Country | Date |
|---|---|---|
| 805,910 | France | of 1936 |